US012671527B2

(12) United States Patent
Fu et al.

(10) Patent No.: US 12,671,527 B2
(45) Date of Patent: Jun. 30, 2026

(54) SURVIVAL TIME PROCESSING METHOD, AND TERMINAL DEVICE

(71) Applicant: GUANGDONG OPPO MOBILE TELECOMMUNICATIONS CORP., LTD., Dongguan (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 340 days.

(21) Appl. No.: 18/243,886

(22) Filed: Sep. 8, 2023

(65) Prior Publication Data

US 2023/0421312 A1 Dec. 28, 2023

Related U.S. Application Data

(63) Continuation of application No. PCT/CN2021/084137, filed on Mar. 30, 2021.

(51) Int. Cl.
*H04L 1/1867* (2023.01)
*H04L 1/1829* (2023.01)

(52) U.S. Cl.
CPC ............ *H04L 1/188* (2013.01); *H04L 1/1848* (2013.01)

(58) Field of Classification Search
CPC ..... H04L 1/188; H04L 1/1848; H04L 1/1822; H04L 1/0003; H04L 1/1819; H04L 1/189;

H04L 5/0092; H04L 5/1469; H04L 5/001; H04L 5/0026; H04W 76/19; H04W 80/02
See application file for complete search history.

(56) References Cited

U.S. PATENT DOCUMENTS

| | | | | |
|---|---|---|---|---|
| 2020/0236579 A1* | 7/2020 | Cho | ...................... | H04W 24/10 |
| 2021/0337404 A1 | 10/2021 | Sun | | |
| 2023/0088622 A1* | 3/2023 | Shimoda | .............. | H04W 68/12 |
| | | | | 455/458 |

FOREIGN PATENT DOCUMENTS

| | | |
|---|---|---|
| CN | 111262648 A | 6/2020 |
| CN | 111327404 A | 6/2020 |
| CN | 111432440 A | 7/2020 |
| WO | 2021002873 A1 | 1/2021 |

OTHER PUBLICATIONS

Communication pursuant to Article 94(3) EPC issued in corresponding European Application No. 21933679.9, mailed Jan. 9, 2025, 8 pages.
Second Office Action issued in corresponding Chinese Application No. 202311386751.7, mailed on Jan. 25, 2025, 15 pages.

(Continued)

*Primary Examiner* — Peter Chen
(74) *Attorney, Agent, or Firm* — BAYES PLLC

(57) ABSTRACT

The present disclosure relates to a survival time processing method, and a terminal device. The processing method comprises: a terminal device executing a relevant operation of a survival time according to first information, wherein the first information comprises relevant information of the survival time. In the embodiments of the present disclosure, a terminal device executes a relevant operation of a survival time according to first information, such that a relevant processing mechanism of the survival time can be specified.

18 Claims, 4 Drawing Sheets

(56) References Cited

OTHER PUBLICATIONS

Notice of priority examination of patent application book issued in corresponding Chinese Application No. 202311386751.7, dated Sep. 19, 2024, 9 pages.

First Office Opinion Notice issued in corresponding Chinese Application No. 202311386751.7, dated Oct. 12, 2024, 14 pages.

Decision of Rejection issued in corresponding Chinese Application No. 202311386751.7, mailed on May 30, 2025, 12 pages.

International Search Report issued in International application No. PCT/CN2021/084137, mailed Dec. 8, 2021.

Written Opinion of the International Searching Authority issued in International application No. PCT/CN2021/084137, mailed Dec. 8, 2021.

"Details of Selective Duplication Procedure", Agenda item: 11.7.4, Source: Lenovo, Motorola Mobility, 3GPP TSG-RAN WG2 Meeting #106, R2-1906731, Reno, USA, May 13-17, 2019.

"Discussion on RAN enhancement to support survival time", Agenda Item: 8.5.2, Source: vivo, 3GPP TSG-RAN WG2 Meeting #113 electronic, R2-2100831, E-Meeting, Jan. 25-Feb 5. 2021.

"3rd Generation Partnership Project; Technical Specification Group Services and System Aspects; Service requirements for cyber-physical control applications in vertical domains; Stage 1 (Release 17)", 3GPP TS 22.104 V17.4.0 (Sep. 2020).

"Further considerations on new QoS", Agenda item: 8.5.4, Source: ZTE Corporation, Sanechips, China Southern Power Grid Co., Ltd., 3GPP TSG-RAN WG2 Meeting #113 E-meeting, R2-2100328, Online, Jan. 25-Feb. 5, 2021.

Extended European Search Report issued in corresponding European application No. 21933679.9, mailed Mar. 12, 2024.

3GPP TSG-RAN WG2 Meeting #113-e R2-2100857 e-Meeting, Jan. 25-Feb. 5, 2021 Source: Apple; Title: Reliability enhancements for CG/SPS.

3GPP RAN WG2 Meeting #113-e R2-2101509 Online, Jan. 25-Feb. 5, 2021 Source: InterDigital; Title: Enhancements based on new QoS requirements.

3GPP TS 23.501 V17.0.0 (Mar. 2021); Technical Specification Group Services and System Aspects; System architecture for the 5G System (5GS); Stage 2(Release 17).

3GPP TR 23.700-20 V2.0.0 (Mar. 2021); Technical Specification Group Services and System Aspects; Study on enhanced support of Industrial Internet of Things (IIoT) in the 5G System (5GS)(Release 17).

* cited by examiner

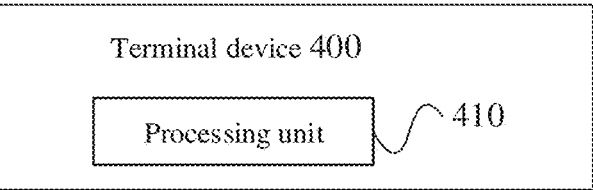
Fig. 3
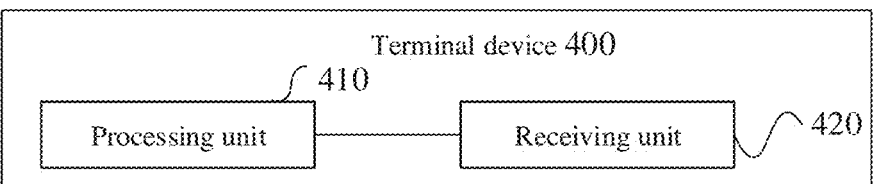
Fig. 4
Fig. 5
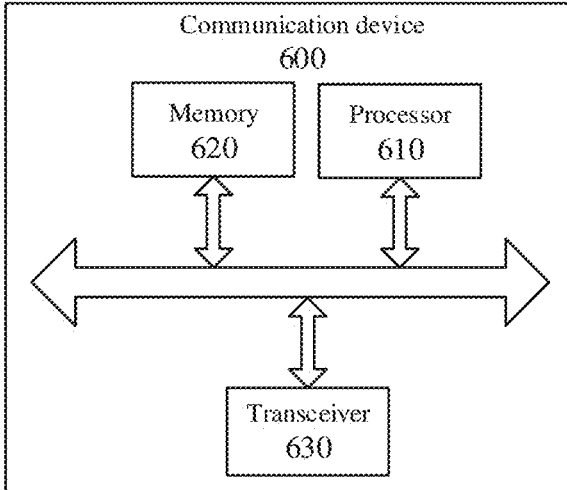
Fig. 6

SURVIVAL TIME PROCESSING METHOD, AND TERMINAL DEVICE

CROSS REFERENCE TO RELATED APPLICATIONS

This application is a continuation of International Application No. PCT/CN2021/084137, filed on Mar. 30, 2021, the entire content of which is incorporated herein by reference.

TECHNICAL FIELD

The present disclosure relates to the field of communications, and more particularly, to a processing method for a survival time and a terminal device.

BACKGROUND

At present, with people's pursuit of speed, delay, high-speed mobility, power efficiency, and diversity and complexity of services in future life, 3rd Generation Partnership Project (3GPP) starts to develop 5th-Generation (5G). Main application scenarios of 5G include enhanced mobile broadband (eMBB), Ultra Reliability and Low Latency Communication (URLLC), and massive Machine Type Communications (mMTC). The R17 URLLC project requires the RAN to be enhanced based on a survival time. However, there is currently no processing mechanism for the survival time.

SUMMARY

Embodiments of the present disclosure provide a processing method for a survival time and a terminal device, which can clarify a related processing mechanism of the survival time.

Embodiments of the present disclosure provide a processing method for a survival time, including: performing, by a terminal device, a relevant operation of a survival time according to first information, wherein the first information includes relevant information of the survival time.

Embodiments of the present disclosure provide a terminal device, including: a processing unit, configured to perform a relevant operation of a survival time according to first information, wherein the first information includes relevant information of the survival time.

Embodiments of the present disclosure provide a terminal device, including a processor and a memory. The memory is configured to store a computer program, and the processor is configured to call and run the computer program stored in the memory to perform the processing method for the survival time as described above.

Embodiments of the present disclosure provide a chip, configured to perform the processing method for the survival time as described above.

Specifically, the chip includes: a processor, configured to call and run a computer program from a memory, so that a device installed with the chip performs the processing method for the survival time as described above.

Embodiments of the present disclosure provide a computer-readable storage medium configured to store a computer program that, when run by a device, causes the device to perform the processing method for the survival time as described above.

Embodiments of the present disclosure provide a computer program product, including computer program instructions, which cause a computer to perform the processing method for the survival time as described above.

Embodiments of the present disclosure provide a computer program which, when run on a computer, causes the computer to perform the processing method for the survival time as described above.

In embodiments of the present disclosure, the terminal device performs the relevant operation of the survival time according to the first information, which can clarify a relevant processing mechanism of the survival time.

BRIEF DESCRIPTION OF THE DRAWINGS

FIG. 3 is a schematic flowchart of a processing method for a survival time according to an embodiment of the present disclosure.

FIG. 4 is a schematic block diagram of a terminal device according to an embodiment of the present disclosure.

FIG. 5 is a schematic block diagram of a terminal device according to another embodiment of the present disclosure.

FIG. 6 is a schematic block diagram of a communication device according to an embodiment of the present disclosure.

DETAILED DESCRIPTION

Figure 1:
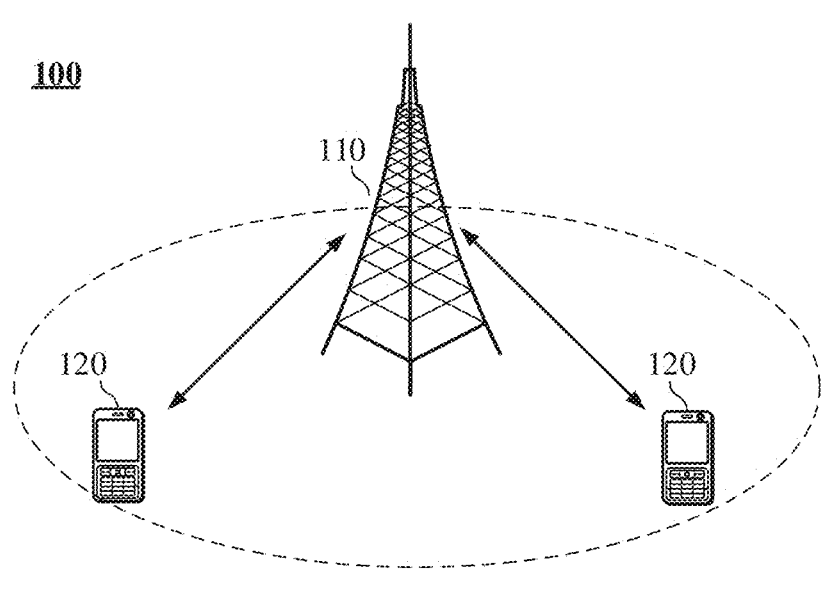
FIG. 1 is a schematic diagram of an application scenario according to an embodiment of the present disclosure.

The technical solutions in embodiments of the present disclosure will be described below in combination with the drawings in embodiments of the present disclosure.

The technical solutions in embodiments of the present disclosure are applicable to various communication systems, for example, a global system of mobile communication (GSM) system, a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a Non-Terrestrial Network (NTN) system, a universal mobile telecommunication system (UMTS), a wireless local area network (WLAN), a wireless fidelity (WiFi), a 5th-Generation (5G) communication system, or other communication systems.

Generally speaking, a conventional communication system generally supports a limited number of connections, and therefore is easy to implement. However, with development of the communication technology, a mobile communication system will not only support conventional communication, but also support, for example, device to device (D2D) communication, machine to machine (M2M) communication, machine type communication (MTC), vehicle to vehicle (V2V) communication, or vehicle to everything (V2X) communication, etc. Embodiments of the present disclosure may also be applied to these communication systems.

Optionally, a communication system in embodiments of the present disclosure may be applied to a carrier aggregation (CA) scenario, a dual connectivity (DC) scenario, or a standalone (SA) networking scenario.

Optionally, the communication system in embodiments of the present disclosure may be applied to an unlicensed spectrum, where the unlicensed spectrum may also be considered as a shared spectrum. Alternatively, the communication system in embodiments of the present disclosure may also be applied to a licensed spectrum, where the licensed spectrum may also be considered a non-shared spectrum.

Embodiments of the present disclosure describe various embodiments in conjunction with a network device and a terminal device. The terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user device, etc.

The terminal device may be a station (ST) in WLAN. Alternatively, the terminal device may be a cellular phone, a cordless phone, a Session Initiation Protocol (SIP) phone, a Wireless Local Loop (WLL) station, a Personal Digital Assistant (PDA) device, a handheld device or a computing device with a wireless communication function, or other processing devices connected to a wireless modem, a vehicle-mounted device, a wearable device, or a terminal device in a next generation communication system, such as a terminal device in an NR network, or a terminal device in a future evolved Public Land Mobile Network (PLMN).

In embodiments of the present disclosure, the terminal device may be deployed on land, including indoor or outdoor, handheld, wearable, or vehicle-mounted terminal device. The terminal device may also be deployed on a water surface, such as on a ship. The terminal device may also be deployed in air, for example, on an aircraft, a balloon, a satellite, etc.

In embodiments of the present disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, or a wireless terminal device in smart home.

By way of example but not limitation, in embodiments of the present disclosure, the terminal device may be a wearable device. The wearable device may also be called a wearable intelligent device, which is a general term of wearable devices designed intelligently and developed on daily wear using wearable technology, such as glasses, gloves, a watch, clothing, and shoes. The wearable device is a portable device that is worn directly on a body or integrated into a user's clothes or accessories. The wearable device is not only a hardware device, but also implements powerful functions through software support, data interaction, and cloud interaction. Generalized wearable intelligent devices include a device with full features, a large size, and full or partial functions which may be implemented without relying on a smart phone, for example, a smart watch or smart glasses, as well as a device that is only focused on a certain application function and needs to cooperate with other devices such as a smart phone, for example, a smart bracelet and a smart jewelry for various physical sign monitoring.

In embodiments of the present disclosure, the network device may be a device for communicating with a mobile device, or an Access Point (AP) in WLAN, or a Base Transceiver Station (BTS) in GSM or CDMA, or a NodeB (NB) in WCDMA, or an Evolutional Node B (eNB or eNodeB) in Long Term Evolution (LTE), or a relay station or an access point, or a vehicle-mounted device, a wearable device, a network device (gNB) in the NR network, a network device in the future evolved PLMN network, or a network device in the NTN network.

As an example but not a limitation, in embodiments of the present disclosure, the network device may have a mobile feature. For example, the network device may be a mobile device. Optionally, the network device may be a satellite, a balloon station. For example, a satellite may be a low earth orbit (LEO) satellite, a medium earth orbit (MEO) satellite, a geostationary earth orbit (GEO) satellite, a high octagonal orbit (HEO) satellite, etc. Optionally, the network device may also be a base station disposed on land or in a water area.

In embodiments of the present disclosure, the network device provides services for a cell, and the terminal device communicates with the network device through transmission resources (for example, frequency domain resources, or spectrum resources) used by the cell. The cell may be a cell corresponding to the network device (e.g., a base station), and the cell may belong to a macro base station, or belong to a base station corresponding to a small cell. Here, the small cell may include a metro cell, a micro cell, a pico cell, a femto cell, etc. These small cells have characteristics such as small coverage and low transmit power, and are suitable for providing high-speed data transmission services.

FIG. 1 exemplarily shows a communication system 100. The communication system includes one network device 110 and two terminal devices 120. Optionally, the communication system 100 may include a plurality of network devices, and a coverage range of each network device may include other numbers of terminal devices 120, which is not limited by embodiments of the present disclosure.

Optionally, the communication system 100 may further include other network entities such as a Mobile Management Entity (MME), an Access and Mobility Management Function (AMF), which is not limited by embodiments of the present disclosure.

The network device may include an access network device and a core network device. That is, the wireless communication system further includes a plurality of core networks for communicating with the access network device. The access network device may be an evolutional node B (eNB or e-NodeB), a macro base station, a micro base station (also known as "small base station"), a pico base station, an Access Point (AP), a Transmission Point (TP), or a new generation Node B (gNodeB), etc. in a long-term evolution (LTE) system, a next-generation (mobile communication system) (next radio, NR) system, or an authorized auxiliary access long-term evolution (LAA-LTE) system.

It should be understood that a device having a communication function in a network or system according to embodiments of the present disclosure may be referred to as a communication device. The communication system shown in FIG. 1 is taken as an example. The communication device may include a network device and a terminal device which have communication functions. The network device and the terminal device may be the specific devices in embodiments of the present disclosure, and descriptions thereof are omitted here. The communication device may further include other devices in the communication system, such as other network entities including the network controller, the mobile management entity, and the like, which is not limited by embodiments of the present disclosure.

It should be understood that the terms "system" and "network" may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "/" herein generally indicates that proceeding and following objects associated thereby are in an "or" relationship.

It should be understood that "indication/indicating" as mentioned in embodiments of the present disclosure may be direct indication or indirect indication, and may also represent there is an association relationship. For example, if A indicates B, it may mean that A directly indicates B. For example, B may be acquired through A. Also, it may mean that A indirectly indicates B. For example, A indicates C, and B may be acquired through C. Besides, it may also mean that there is an association relationship between A and B.

In the description of embodiments of the present disclosure, the term "corresponding/respective" may mean that there is a direct or indirect correspondence between two items, or may mean that there is an association relationship between the two items, or may also mean that there is an indicating-and-indicated relationship or a configuring-and-configured relationship between the two items.

In order to facilitate the understanding of the technical solutions in embodiments of the present disclosure, related technologies in embodiments of the present disclosure are described below. The following related technologies as optional solutions may be arbitrarily combined with the technical solutions in embodiments of the present disclosure, which belong to the protection scope of embodiments of the present disclosure.

A survival time may be sent to a base station together with Time Sensitive Communication Assistance Information (TSCAI).

The survival time is specified by an Application Function (AF) in units of "time" with a timescale corresponding to a burst periodicity, or the survival time corresponds to the maximum number of consecutive message transmission failures, where a message is a single burst including a single packet/frame or an aggregated set of packets/frames, and a transmission failure occurs when a Packet Delay Budget requirement corresponding to the message is not satisfied.

That is to say, for an application or a service, when the survival time is represented by a service period, and if the survival time=the period, the next packet must be transmitted correctly when a previous packet fails to be transmitted. Otherwise, transmission errors occur to a communication service.

Alternatively, for the application or the service, in a case that the survival time is represented by packets that are transmitted consecutively and incorrectly, if the survival time=X packets that are transmitted consecutively and incorrectly, transmission errors occur to the communication service when X packets are transmitted consecutively and incorrectly. Therefore, when X−1 consecutive packets are transmitted incorrectly, the next packet must be transmitted correctly.

One burst corresponds to one message, and one burst includes one or more packets.

A survival time of a certain service is a multiple of the service period, such as 1 time (which represents that no such case may occur where two consecutive packet are lost), 3 times and so on. A survival time of a certain service is 0

(which represents that no packet may be lost). Therefore, a survival time detection mechanism is required to ensure that the maximum tolerant consecutive packet error is avoided.

In addition, under strict survival time requirements, once a Packet Delay Budget (PDB) of a service is less than a Round-Trip Time (RTT), a peer end may not come in time for feeding back an Acknowledgment (ACK), and the PDB has already timed out, which is necessary to perform a more reliable transmission. This may lead to a redundant transmission (the transmission would have been correct, but there is no time to receive the ACK, resulting in a highly reliable retransmission).

Figure 2:
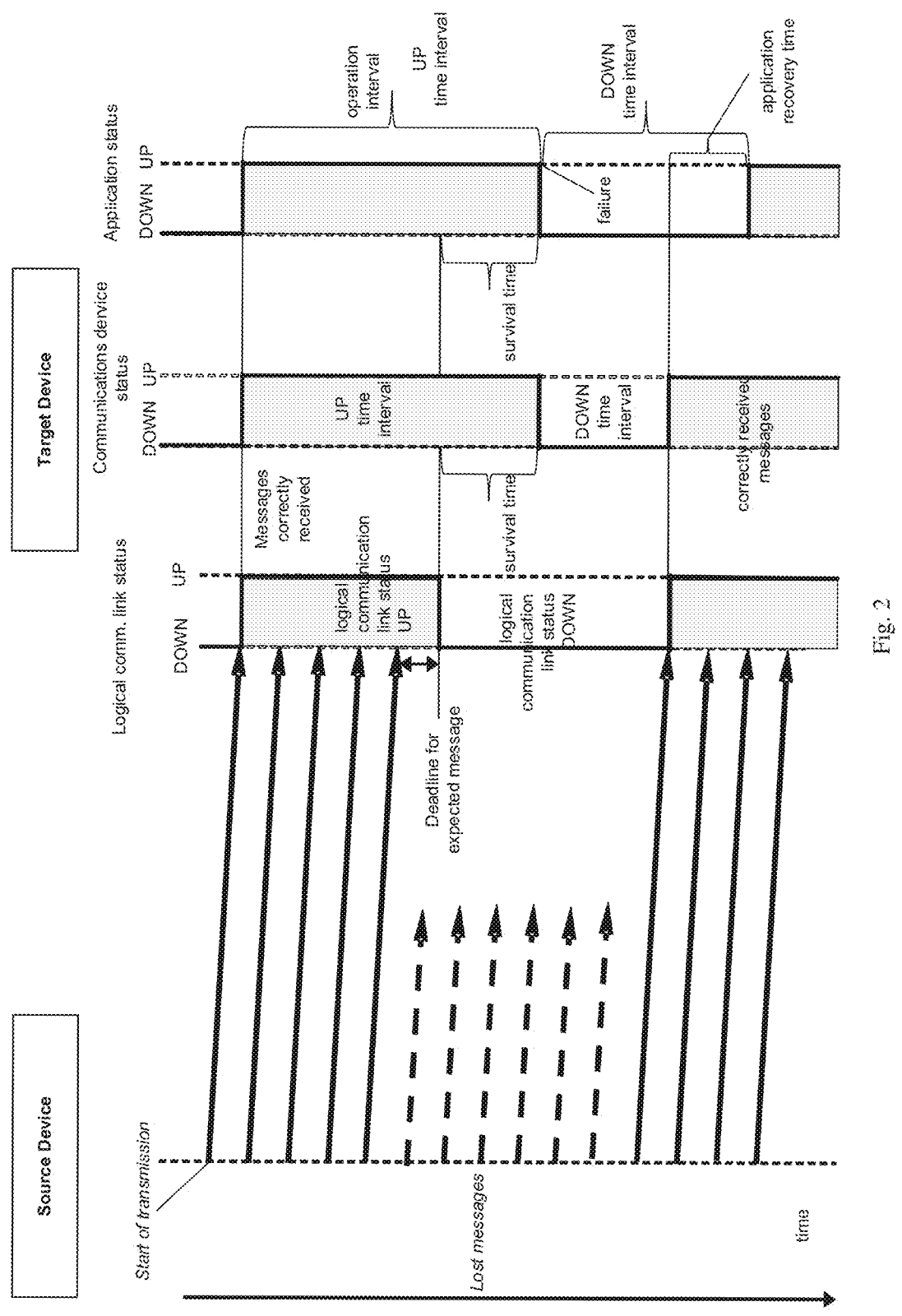
FIG. 2 is a schematic diagram of the use of survival time.

As shown in FIG. 2, a schematic diagram of the use of a survival time, a relation between a logical communication link, a communication service, and an application status (e.g., a lost message) is included in FIG. 2. An application layer considers that the survival time has been entered when a packet is lost. The so-called survival time is a transition period. After this transition period, an application layer transmission is considered to have entered a DOWN status.

Embodiments of the present disclosure can clarify a detection and processing mechanism for the survival time. Furthermore, how to reduce a redundant transmission and waste of resource may be clarified in the case that strict service transmission requirements of the survival time are guaranteed.

FIG. 3 is a schematic flowchart of a processing method 200 for a survival time according to an embodiment of the present disclosure. The method may be optionally applied to the system shown in FIG. 1, but is not limited thereto. The method includes at least some of the following contents.

In S210, a terminal device performs a relevant operation of the survival time according to first information, where the first information includes relevant information of the survival time.

Optionally, the relevant information of the survival time includes at least one of: the survival time, a Data Radio Bearer (DRB) identity, a Quality of Service (QoS) flow identity, a Packet Data Unit (PDU) session identity, a service arrival time, a service pattern, a service period, a related timer configuration, indication information for using the relevant information of the survival time, or indication information for performing the relevant operation of the survival time.

For example, the relevant information of the survival time may be configured in a RRC configuration (RRCconfig). Specifically, the relevant information of the survival time may be configured in, for example, at least one of a DRB configuration (DRBconfig), a CG configuration (CGconfig), a LCH configuration (LCH config), a MAC configuration (MAC config), a serving cell configuration (serving cell config), or a BWP configuration (BWP config).

Optionally, the first information is predefined, or indicated by an access network or a core network.

Optionally, the method further includes receiving, by the terminal device, an indication signaling from a network device, where the indication signaling is configured to indicate whether to perform the relevant operation of the survival time, and/or, which operation of the survival time is to be performed. For example, the terminal device may be only enabled to perform the relevant operation of the survival time after being indicated by the network. For different operations, the indication signaling may be different or the same. After the terminal device receives the indication signaling, the terminal device can perform the relevant operation of the survival time if the indication signaling indicates to perform the relevant operation of the survival time, or the terminal device does not perform the relevant operation of the survival time if the indication signaling does not indicate to perform the relevant operation of the survival time. In addition, if the indication signaling indicates which operation of the survival time is to be performed, the terminal device may perform the survival time operation indicated in the indication signaling. Furthermore, if the indication signaling does not indicate which operation of the survival time is to be performed, the terminal device may perform a default survival time operation. Optionally, the default survival time operation is predefined, or indicated by the access network or the core network.

Optionally, the indication signaling includes at least one of Radio Resource Control (RRC), Media Access Control (MAC), or Downlink Control Information (DCI).

Optionally, performing the relevant operation of the survival time includes at least one of:

determining whether to enter or start the survival time;

determining whether to exit or end the survival time;

determining a survival time status; or determining an action of a timer related to the survival time.

Optionally, determining whether to enter or start the survival time includes at least one of:

determining to enter or start the survival time in a case that a packet or a Packet Data Convergence Protocol (PDCP) Service Data Unit (SDU) is considered to be at least one of lost, unsuccessfully received, or transmitted in error;

determining to enter or start the survival time in a case that the packet or the PDCP SDU arrives at a PDCP layer of a sender;

determining to enter or start the survival time in a case that the packet or the PDCP SDU leaves the PDCP layer of the sender;

sending the packet or the PDCP SDU, and determining to enter or start the survival time;

sending a SDU, a PDU, a Transport Block (TB) or a Physical Uplink Shared Channel (PUSCH), and determining to enter or start the survival time;

determining to enter or start the survival time in a case that the PDCP SDU is considered to be at least one of lost, unsuccessfully received, or transmitted in error; or determining to enter or start the survival time in a case that the SDU, the PDU, the TB or the PUSCH is considered to be at least one of lost, unsuccessfully received, or transmitted in error.

The SDU may be a PDCP SDU, a RLC SDU, a MAC SDU, etc., and the PDU may include a PDCP PDU, a RLC PDU, a MAC PDU, etc.

Optionally, entering or starting the survival time indicates entering or starting the survival time status.

Optionally, determining the action of the timer related to the survival time includes:

determining whether to enter or start the survival time by using a first timer.

Optionally, a condition for starting the first timer includes at least one of:

the packet or the PDCP SDU arriving at the PDCP layer of the sender;

the packet, the PDCP SDU or the PDCP PDU leaving the PDCP layer of the sender;

sending the packet or the PDCP SDU; or sending the SDU, the PDU, the TB, or the PUSCH.

Optionally, a duration of the first timer is related to a Packet Delay Budget (PDB).

Optionally, determining whether to enter or start the survival time by using the first timer includes:

entering or starting the survival time, if a Non-Acknowledgment (NACK) feedback is received before expiration of the first timer, no Acknowledgment (ACK) feedback is received before the expiration of the first timer, or no feedback is received before the expiration of the first timer or after the expiration of the first timer.

For example, the ACK and/or the NACK may have characteristics as follows:

the ACK and/or the NACK may be for a Hybrid Automatic Repeat-reQuest (HARD), an Automatic Repeat-reQuest (ARQ), or a PDCP status report; or the ACK and/or the NACK may correspond to a MAC, Radio Link Control (RLC), or PDCP layer.

According to the first information, a receiver may periodically trigger a feedback, feed back when receiving a packet, feed back when not receiving the packet at a specific resource (such as CG) position, feed back when the packet received at the specific resource is incorrectly decoded, or feed back when receiving a packet with a succeeding SN number.

For example, the case of receiving the packet with the succeeding SN number may include: a packet with SN=A is not received, but a packet with SN=A+X is received, where X may be preconfigured, indicated or configured, and may be 1.

Optionally, determining whether to exit or end the survival time includes at least one of:

in a case of having entered or started the survival time or maintaining the survival time status, determining to exit or end the survival time if the packet or the PDCP SDU is successfully transmitted;

in a case of having entered or started the survival time or maintaining the survival time status, determining to exit or end the survival time if the SDU, the PDU, the TB, or the PUSCH is successfully transmitted;

in a case of having entered or started the survival time or maintaining the survival time status, determining to exit or end the survival time if an ACK feedback for at least one packet or at least one PDCP SDU is received; or in a case of having entered or started the survival time or maintaining the survival time status, determining to exit or end the survival time if an ACK feedback for at least one SDU, at least one PDU, at least one TB, or at least one PUSCH is received.

Optionally, exiting or ending the survival time indicates exiting or ending the survival time status.

Optionally, determining the action of the timer related to the survival time further includes at least one of:

in a case of having entered or started the survival time, or in a case of having entered or started the survival time status, starting a second timer; or in a case of having exited or ended the survival time, or in a case of having exited or ended the survival time status, stopping the second timer.

In addition, the terminal device may stop the second timer after performing the reporting or performing the specific transmission.

Optionally, the method further includes at least one of:

reporting to a higher layer a problem or triggering a link transmission failure reporting or initiating a RRC connection reestablishment, after expiration of the second timer or if no reporting or specific transmission is performed before the expiration of the second timer;

exiting or ending the survival time after the expiration of the second timer;

exiting or ending the survival time if the packet or the PDCP SDU is successfully transmitted before the expiration of the second timer;

exiting or ending the survival time if the SDU, the PDU, the TB, or the PUSCH is successfully transmitted before the expiration of the second timer;

exiting or ending the survival time if an ACK feedback for at least one packet or at least one PDCP SDU is received before the expiration of the second timer; or exiting or ending the survival time if an ACK feedback for at least one SDU, at least one PDU, at least one TB, or at least one PUSCH is received before the expiration of the second timer.

Optionally, performing the relevant operation of the survival time further includes at least one of:

starting the first timer in a case of receiving an ACK feedback;

restarting the first timer in a case that the ACK feedback is received before the expiration of the first timer;

stopping the first timer, entering or starting the survival time, and/or starting the second timer, in a case that the ACK feedback is not received or a NACK feedback is received or no feedback is received before the expiration of the first timer;

entering or starting the survival time, and/or starting the second timer, after the expiration of the first timer;

stopping the second timer, and/or, starting the first timer, upon entering or starting the survival time, maintaining the survival time status, or during operation of the second timer; or in a case that the NACK feedback is always received or the ACK feedback is never received or feedback is never received in the survival time or the survival time status or during the operation of the second timer, starting the first timer or triggering link transmission failure reporting or initiating a RRC connection reestablishment or triggering problem reporting if exiting or ending the survival time status or the second timer expires.

Optionally, performing the relevant operation of the survival time further includes at least one of:

determining whether to receive or process a corresponding Downlink Feedback Indication (DFI);

determining whether to perform reporting; or determining whether to perform a specific transmission.

Optionally, performing, by the terminal device, the relevant operation of the survival time according to the first information includes:

performing, by the terminal device, at least one of the following operations according to the first information in a case that a first condition is met:

determining whether to perform reporting; or determining whether to perform a specific transmission.

Optionally, the first condition includes at least one of: the survival time being a specific value, the survival time being less than a Round-Trip Time (RTT), the survival time being less than Y times the RTT, the PDB being less than the RTT, the PDB being less than a service period or a resource period, the PDB being less than X times the RTT, not a specific subcarrier spacing, a Time Division Duplex (TDD) operation mode or configuration, indicating or configuring a jitter, or a specific jitter value.

X and/or Y may have various values, such as 0 or any integer value (1, 2 . . . ). X and Y may be the same or different.

Optionally, in the present disclosure, the SDU may be at least one of the PDCP SDU, the RLC SDU, or the MAC SDU, and the PDU may include at least one of the PDCP PDU, the RLC PDU, or the MAC PDU.

Optionally, performing the specific transmission includes:

performing different transmissions for an initial transmission and a retransmission of the packet, the PDCP SDU, or the MAC PDU; or performing different transmissions for an initial transmission and a retransmission of the SDU, the PDU, the TB, or the PUSCH.

Optionally, performing the different transmissions for the initial transmission and the retransmission includes at least one of:

performing a highly reliable transmission for at least one of the initial transmission and the retransmission;

performing a highly reliable transmission for at least one retransmission; or performing a highly reliable transmission for the initial transmission.

For example, the highly reliable transmission is performed for the initial transmission of the packet, the PDCP SDU, or the MAC PDU, and the highly reliable transmission is not performed for the retransmission.

For another example, the highly reliable transmission is not performed for the initial transmission of the SDU, the PDU, the TB, or the PUSCH, and the highly reliable transmission is performed for the retransmission.

For yet another example, the highly reliable transmission is performed for a certain retransmission of the packet, the PDCP SDU, or the MAC PDU, and the highly reliable transmission is not performed for other retransmissions and the initial transmission.

Optionally, performing the specific transmission further includes:

performing the same transmission for an initial transmission and a retransmission of the packet, the PDCP SDU, or the MAC PDU; or performing the same transmission for an initial transmission and a retransmission of the SDU, the PDU, the TB, or the PUSCH.

Optionally, performing the same transmission for the initial transmission and the retransmission includes:

performing a highly reliable transmission for the initial transmission and the retransmission.

For example, the highly reliable transmission is performed for both the initial transmission and the retransmission of the packet, the PDCP SDU, or the MAC PDU.

For another example, the highly reliable transmission is performed for both the initial transmission and the retransmission of the SDU, the PDU, the TB, or the PUSCH.

Optionally, performing, by the terminal device, the relevant operation of the survival time according to the first information includes:

performing, by the terminal device, at least one of the following operations according to the first information in a case that a second condition is met:

determining whether to receive or process a corresponding DFI;

determining whether to perform reporting; or determining whether to perform a specific transmission.

In embodiments of the present disclosure, the corresponding DFI may include a DFI corresponding to the HARQ process, a DFI corresponding to the LCH, a DFI corresponding to the CG, or a DFI corresponding to the survival time, and the like.

Optionally, the first information further includes at least one of:

a correspondence between the survival time and a Logical Channel (LCH);

a correspondence between the survival time and a Hybrid Automatic Repeat reQuest (HARQ); or a correspondence between the survival time and a Configured Grant (CG).

Optionally, the second condition includes at least one of:

the survival time being bonded to the LCH;

the survival time being bonded to a HARQ process; or the survival time being bonded to the CG.

For example, if the survival time is bound to the LCH, the terminal device determines, according to the first information, whether to receive or process the corresponding DFI, whether to perform the reporting, or whether to perform the specific transmission.

For another example, if the survival time is bound to the HARQ process, the terminal device determines, according to the first information, whether to receive or process the corresponding DFI, whether to perform the reporting, or whether to perform the specific transmission.

For yet another example, if the survival time is bound to the CG, the terminal device determines, according to the first information, whether to receive or process the corresponding DFI, whether to perform the reporting, or whether to perform the specific transmission.

Optionally, performing the reporting or performing the specific transmission includes:

performing a DFI feedback, and/or, performing the reporting or performing the specific transmission, on a HARQ process corresponding to the survival time. Specifically, the DFI feedback may be performed on the HARQ process corresponding to the survival time, or the reporting may be performed on the HARQ process corresponding to the survival time, or the specific transmission may be performed on the HARQ process corresponding to the survival time.

Optionally, performing the reporting or performing the specific transmission further includes at least one of:

performing the reporting or performing the specific transmission on a HARQ process or a corresponding LCH or CG whose DFI is NACK in a case of receiving the DFI; or performing the reporting or performing the specific transmission on a DFI feedback for a HARQ process corresponding to the survival time or a DFI feedback for a LCH or a CG corresponding to the survival time.

Optionally, performing the specific transmission includes: performing the specific transmission by using a subsequent CG resource. For example, the specific transmission may be performed using the latest CG after the feedback is received, or a first available CG, or an available CG that satisfies the minimum DFI feedback time.

Optionally, performing the specific transmission includes: performing a highly reliable transmission.

Optionally, performing the highly reliable transmission includes at least one of: performing a duplicate transmission, performing a repetition transmission, using another set of duplicate transmission times, using another set of repetition transmission times, using a second set of Modulation and Coding Schemes (MCSs), using another resource configuration, using another set of resource configuration parameters, using another set of LCH mapping restrictions, cancelling a LCH mapping restriction, using a first set of LCH configuration parameters, using a second set of physical layer transmission parameters, or using a second prioritization processing method.

Optionally, the physical layer transmission parameter may include at least one of: a transmit power, a power control parameter, a physical layer priority, a RV version, a padding port, a scrambling sequence, pre-coding, the number of layers, and so on.

Optionally, the prioritization processing method includes at least one of: a Rel-15 prioritization processing method (e.g., at least one of not configuring or supporting LCH-based prioritization, not configuring or supporting a PHY priority parameter, or not configuring or supporting a second resource prioritization processing), a processing method based on the LCH-based prioritization, a prioritization processing method based on a PHY priority parameter, or a second resource prioritization processing method.

The second resource prioritization processing method is used to, for a resource (such as CG) based on a LCH priority or a priority of a resource corresponding to the HARQ process, determine whether to give priority to a new transmission or a retransmission, and/or, determine to select which one of the plurality of retransmissions, and/or, determine to select which one of the plurality of new transmissions. The second resource prioritization processing method may be configured/indicated/enabled by a new parameter, or may be configured/indicated/enabled by reusing a LCH-based prioritization parameter. For example, the Rel-15 prioritization processing method is used during a normal transmission, and the method based on the LCH-based prioritization is used during a reliable transmission. For another example, the method based on the LCH-based prioritization is used during the normal transmission, and the method based on the LCH-based prioritization and the second resource priority is used during the reliable transmission. For yet another example, the method based on the LCH-based prioritization and the second resource priority processing is used during the normal transmission, and the method based on the LCH-based prioritization is used during the reliable transmission.

For example, given two sets of MCS, one set is for the normal transmission or the relax transmission, and the other set is for the highly reliable transmission. The MCS for the normal transmission may be called a first set of MCS, and the MCS for the highly reliable transmission may be called a second set of MCS.

For another example, given two resource configurations, one is for the normal transmission or the relax transmission, and the other is for the highly reliable transmission. The resource configuration for the highly reliable transmission may be referred to as another resource configuration.

For yet another example, given two sets of resource configuration parameters, one set is for the normal transmission or the relax transmission, and the other set is for the highly reliable transmission. The resource configuration parameters for the highly reliable transmission may be referred to as another set of resource configuration parameters.

For still another example, given two sets of LCH mapping restrictions, one set is for the normal transmission or the relax transmission, and the other set is for the highly reliable transmission. The LCH mapping restrictions for the highly reliable transmission may be referred to as another set of LCH mapping restrictions.

In embodiments of the present disclosure, the network may pre-configure the above-mentioned parameter, configuration, resource, etc. corresponding to the highly reliable transmission.

Optionally, the UE reserves two sets of parameters, configurations, resources, etc., and uses different parameters, configurations, and resources in different situations (another set of parameters, configurations, and resources are deactivated or suspended).

Optionally, determining whether to perform the reporting or determining whether to perform the specific transmission includes at least one of: performing the reporting or performing the specific transmission in a case of having entered or started the survival time;

performing the reporting or performing the specific transmission before the expiration of the second timer;

performing the reporting or performing the specific transmission upon entering or starting the survival time;

performing the reporting or performing the specific transmission while maintaining the survival time status; or performing the reporting or performing the specific transmission during the operation of the second timer.

Optionally, performing the specific transmission further includes:

performing the transmission according to a specific rule.

Optionally, performing the transmission according to the specific rule includes at least one of:

for an object, performing the transmission according to a first rule every X packets or PDCP SDUs, and performing the transmission according to a second rule every Y packets or PDCP SDUs; or for the object, performing the transmission according to the first rule every X SDUs or PDUs or TBs or PUSCHs, and performing the transmission according to the second rule every Y packets or SDUs or PDUs or TBs or PUSCHs. Values of X and Y may be related to the survival time.

Optionally, the first rule and the second rule are processed interactively. For example, if the survival time is 1, it means that a packet follows the first rule, the next packet follows the second rule, and the packet after next follows the first rule.

Optionally, the method further includes:

optionally, determining an interaction mode between the first rule and the second rule, and/or determining whether to use the first rule or the second rule, according to a duration, an order, or an indication.

Optionally, the survival time is exited or ended, or the second timer is stopped, and the terminal device uses the normal transmission, the relax transmission, the non-specific transmission, or uses the second rule for the transmission.

Optionally, processing or a processing rule of the packet, the PDCP SDU, the SDU, the PDU, the TB, or the PUSCH is performed or determined based on at least one of the PDCP, the RLC, the MAC, or a Physical Layer (PHY). For example, which rule that is used for processing the X-th or Y-th packet may be determined by at least one of the PDCP, the RLC, the MAC, and the PHY. For example, for one or more PDCP PDUs corresponding to a DRB, which PDCP PDU is transmitted to the first RLC entity and which PDCP PDU is transmitted to the second RLC entity is determined by the PDCP layer. The first RLC entity and the second RLC entity respectively correspond to different transmissions (such as the normal transmission and the highly reliable transmission, such as different CG resources, such as different carriers, different transmission priorities), or different transmission parameters (such as the LCH mapping parameter, different logical channel mapping restrictions). For another example, for a plurality of MAC PDUs, the MAC layer determines which transmission to use (such as the normal transmission and the highly reliable transmission, such as different CG resources, such as different carriers, different transmission priorities, transmissions of different transmission parameters).

Optionally, processing or a processing rule of the packet, the PDCP SDU, the SDU, the PDU, the TB, or the PUSCH is determined based on the arrival order and/or the number of packets, PDCP SDUs, SDUs, PDUs, TBs, or PUSCHs. For example, the terminal device may determine which rule is used for processing the packet according to the arrival order and/or the number of packets.

Optionally, the arrival order of the packet, the PDCP SDU, the SDU, the PDU, the TB, or the PUSCH is represented by a Sequence (SN) number, and the SN number includes at least one of a PDCP SN number or a RLC SN number.

Optionally, a relationship between the first rule and the second rule includes at least one of:

the first rule being to select a first RLC entity or a first logical channel, and the second rule being to select a second RLC entity;

the first rule being to select a normal transmission or a relax transmission, and the second rule being to select the highly reliable transmission; or the first rule being to select a first parameter, and the second rule being to select a second parameter. For example, the first parameter and/or the second parameter may be the resource configuration parameter, the LCH configuration parameter, and the like.

Optionally, the specific transmission rule is further configured to perform processing in a case of configuring or indicating the first information, and/or perform processing on an object corresponding to the first information. For example, the object corresponding to the first information may include the bearer, the LCH, the PDCP, the PDU session, the IP flow, and so on. Optionally, an object not corresponding to the first information may not be processed.

In embodiments of the present disclosure, the terminal device performs the relevant operation of the survival time according to the first information, which can clarify the related processing mechanism of the survival time. Further, the start and end statuses of the survival time can be more accurately controlled. Furthermore, the feedback, the reporting, the specific transmission, etc. may be performed based on the survival time, so as to ensure the service transmission performance under strict requirements and avoid the resource waste.

Example 1: Method for Entering and Exiting Survival Time

A specific implementation of this example is as follows.

1. A UE acquires first information, where the first information is configured to include relevant information of the survival time.

For example, the first information includes at least one of: the survival time, a DRB identity, a QoS flow identity, a PDU session identity, a service arrival time, a service pattern, a service period, a related timer configuration, indication information for using the relevant information of the survival time, or indication information for performing the relevant operation of the survival time.

For another example, the first information is predefined, or indicated by an access network or a core network.

In addition, the UE may receive indication signaling from a network device, where the indication signaling is configured to indicate whether to perform the relevant operation of the survival time, and/or, which operation of the survival time is to be performed.

2. The UE performs, according to the first information, at least one of:

determining whether to enter or start the survival time;

determining whether to exit or end the survival time;

determining a survival time status;

determining a start or stop of a timer related to the survival time;

determining whether to receive or process a corresponding Downlink Feedback Indication (DFI);

determining whether to perform reporting; or determining whether to perform a specific transmission.

Specifically:

a. it is considered that the survival time is entered or started under at least one of the following cases.

In a case that a packet or a PDCP SDU is considered to be at least one of lost, unsuccessfully received, transmitted in error, or the like, it is considered that the survival time is entered or started.

In a case that the packet or the PDCP SDU arrives at a PDCP layer of a sender, it is determined to enter or start the survival time.

In a case that the packet or the PDCP SDU leaves the PDCP layer of the sender, it is determined to enter or start the survival time.

The packet or the PDCP SDU is sent, and it is determined to enter or start the survival time.

A SDU, a PDU, a TB, or a PUSCH is sent, and it is determined to enter or start the survival time.

In a case that the PDCP SDU is considered to be at least one of lost, unsuccessfully received, or transmitted in error, it is determined to enter or start the survival time.

In a case that the SDU, the PDU, the TB, or the PUSCH is considered to be at least one of lost, unsuccessfully received, or transmitted in error, it is determined to enter or start the survival time.

Optionally, entering or starting the survival time may be characterized as entering or starting the survival time status.

Optionally, a first timer is introduced to detect the survival time, or to measure whether to enter or start the survival time. An example is as follows.

(1) the first timer is started, when the packet or the PDCP SDU arrives at the PDCP layer of the sender, or when the packet, the PDCP SDU, or the PDCP PDU leaves the PDCP layer of the sender, or when the terminal sends the packet or the PDCP SDU, or when the terminal sends the SDU, the PDU, the TB, or the PUSCH.

(2) A duration of the first timer is related to a Packet Delay Budget (PDB). For example, the duration of the first timer is equal to 5G-AN PDB.

(3) When a NACK feedback is received before the first timer expires, or, an ACK feedback is not received before the first timer expires, or, no feedback is received before the first timer expires, or, after the first timer expires, the survival time is entered or started. For example, for the packet or the PDCP SDU, if the corresponding NACK feedback is received before the first timer expires, or if the corresponding ACK feedback is not received before the first timer expires, it is considered that the packet or the PDCP SDU is lost, and/or, the survival time is entered or started.

b. Optionally, it is considered that the survival time is to be exited or ended under at least one of the following cases.

In a case of having entered or started the survival time or maintaining the survival time status, it is determined to exit or end the survival time if the packet or the PDCP SDU is successfully transmitted.

In a case of having entered or started the survival time or maintaining the survival time status, it is determined to exit or end the survival time if the SDU, the PDU, the TB, or the PUSCH is successfully transmitted.

In a case of having entered or started the survival time or maintaining the survival time status, the survival time is to be exited or ended if an ACK corresponding to at least one packet or at least one PDCP SDU is received.

In a case of having entered or started the survival time or maintaining the survival time status, it is determined to exit or end the survival time if an ACK feedback for at least one SDU, at least one PDU, at least one TB, or at least one PUSCH is received.

Exiting or ending the survival time may represent exiting or ending the survival time status.

c. Optionally, a second timer is introduced. In the case of entering or starting the survival time, or upon entering or starting the survival time status, the second timer is started. Upon exiting or ending the survival time status, the second timer is stopped.

d. Optionally, upon entering or starting the survival time, or before the second timer expires, the reporting is performed or the specific transmission, such as the highly reliable transmission, is performed.

In addition, the second step of Example 1 may be replaced with at least one of the following options.

The first timer is started in a case that the ACK is received.

The first timer is restarted in a case that the ACK is received before the first timer expires.

The first timer is stopped and the survival time is entered or started, and/or the second timer is started, in a case that the ACK is not received or the NACK is received or no feedback is received before the first timer expires.

The reporting is performed or the specific transmission is performed in the survival time or the survival time status, or during the operation of the second timer.

The second timer is stopped, and/or, the first timer is started, in a case that the ACK is received in the survival time or the survival time status, or during the operation of the second timer.

In a case that the NACK feedback is always received or the ACK feedback is never received or the feedback is never received in the survival time or the survival time status or during the operation of the second timer, the survival time status is exited or ended, or the second timer expires, the first timer is started, or link transmission failure reporting is triggered, or a RRC connection reestablishment is initiated.

This example clarifies the method for determining the entry and exit or end of the survival time, and clarifies the processing mechanism related to the survival time.

Example 2: a method to guarantee a strict survival time requirement is proposed. Specifically, the reporting or the specific transmission is performed when a specific condition is met, so as to ensure a specific survival time.

A specific implementation of this example is as follows.

1. A UE acquires first information, where the first information is configured to include the relevant information of the survival time.

For example, the first information includes at least one of: the survival time, a DRB identity, a QoS flow identity, a PDU session identity, a service arrival time, a service pattern, a service period, or a related timer configuration.

For another example, the first information is predefined, or indicated by an access network or a core network.

2. In a case that the first condition is met, the UE determines, according to the first information, whether to perform reporting or perform a specific transmission (e.g., performing a highly reliable transmission, such as a UE-based highly reliable transmission).

Specifically, the first condition may be at least one of: the survival time being a specific value (for example, the survival time is 0), the survival time being less than a RTT, the survival time being less than Y times the RTT, the PDB being less than the RTT, the PDB being less than a service period or a resource period (such as the CG or SPS), the PDB being less than X times the RTT, not a specific subcarrier spacing, a TDD operation mode or configuration, or indicating or configuring a jitter. X and Y may be 0 or other positive integers. X and Y may be the same or different.

The UE performs the highly reliable transmission. Examples are as follows.

(1) Different transmissions are performed for an initial transmission and a retransmission of the packet, the PDCP SDU, or the MAC PDU; or different transmissions are performed for an initial transmission and a retransmission of the SDU, the PDU, the TB, or the PUSCH. Optionally, a highly reliable transmission is performed for at least one of the initial transmission or the retransmission, or the highly reliable transmission is performed for a plurality of retransmissions, or the highly reliable transmission is performed for the initial transmission.

(2) The same transmission is performed for an initial transmission and a retransmission of the packet, the PDCP SDU, or the MAC PDU; or the same transmission is performed for an initial transmission and a retransmission of the SDU, the PDU, the TB, or the PUSCH. Optionally, the highly reliable transmission is performed for both the initial transmission and the retransmission.

The highly reliable transmission may be at least one of: performing a duplicate transmission, performing a repetition transmission, using another set of duplicate transmission times, using another set of repetition transmission times, using a second set of MCS, using another resource configuration, using another set of resource configuration parameters, using another set of LCH mapping restrictions, cancelling a LCH mapping restriction, using a first set of LCH configuration parameters, using a second set of physical layer transmission parameters, or using a second prioritization processing method.

This example proposes a method to guarantee the survival time or avoid reaching the maximum tolerable packet loss time or number in a specific case, which ensures the service transmission performance under the strict survival time requirement.

Example 3: a method for guaranteeing a survival time for a specific LCH, CG, or HARQ is proposed, so as to avoid the resource waste while ensuring the survival time.

1. A UE acquires first information, where the first information is configured to include the relevant information of the survival time.

Specifically, the first information includes at least one of: the survival time, a DRB identity, a QoS flow identity, a PDU session identity, a service arrival time, a service pattern, a service period, or a related timer configuration.

The first information is predefined, or indicated by an access network or a core network.

A correspondence between the survival time and the CG/LCH/HARQ is given by the network or predefined.

2. In a case that the second condition is met, the UE performs reporting or a specific transmission according to the first information (e.g., performing a highly reliable transmission, such as a UE-based highly reliable transmission).

Optionally, the second condition may include at least one of:

the survival time being bonded to the LCH;

the survival time being bonded to a HARQ process; or the survival time being bonded to the CG.

Specifically, the second step may include at least one of the following.

a. The survival time is bound to the LCH, the LCH and the CG have a mapping relationship, and the CG is related to the HARQ process. The terminal device may only perform the DFI feedback, and/or, perform the reporting or perform the specific transmission, on the HARQ process corresponding to the survival time. For example, during the operation of the second timer or after the expiration of CGT or CGRT, the reporting or the specific transmission is performed.

b. The survival time is bound to the HARQ process, and the DFI feedback is only performed on, and/or, the reporting or the specific transmission is only performed on, the corresponding HARQ process. For example, during the operation of the second timer or upon the expiration of CGT or after the expiration of CGRT, the reporting or the specific transmission is performed.

c. The survival time is bound to the CG, and DFI feedback, and/or, reporting or the specific transmission, is only performed on the HARQ process corresponding to the CG. For example, during the operation of the second timer or upon the expiration of CGT or after the expiration of CGRT, the reporting or the specific transmission is performed.

d. Optionally, when the UE performs the reporting or performs the specific transmission, the UE uses a subsequent CG resource, such as a first available CG, to perform the specific transmission.

e. Optionally, in a case of receiving the DFI, the UE performs the reporting or the specific transmission for the HARQ process or the corresponding LCH or CG whose DFI is NACK. Optionally, the UE uses the subsequent CG resource, such as the first available CG, to perform the specific transmission.

f. The highly reliable transmission may include at least one of: performing a duplicate transmission, performing a repetition transmission, using another set of duplicate transmission times, using another set of repetition transmission times, using a second set of MCS, using another resource configuration, using another set of resource configuration parameters, using another set of LCH mapping restrictions, cancelling a LCH mapping restriction, using a first set of LCH configuration parameters, using a second set of physical layer transmission parameters, or using a second prioritization processing method.

This example proposes a method to avoid the resource waste while ensuring the survival time, which ensures the service transmission performance under the strict survival time requirement and avoids excessive occupation of air interface resources.

In Example 1, Example 2 and Example 3, performing the specific transmission further includes: performing the transmission according to a specific rule.

Exemplarily, performing the transmission according to the specific rule includes at least one of:

for an object, performing the transmission according to a first rule every X packets or PDCP SDUs, and performing the transmission according to a second rule every Y packets or PDCP SDUs; or for the object, performing the transmission according to the first rule every X SDUs or PDUs or TBs or PUSCHs, and performing the transmission according to the second rule every Y packets or SDUs or PDUs or TBs or PUSCHs.

The first rule and the second rule are processed interactively.

Specifically, an interaction mode between the first rule and the second rule may be determined, and/or whether to use the first rule or the second rule may be determined, according to a duration, an order, or an indication.

Optionally, processing or a processing rule of the packet, the PDCP SDU, the SDU, the PDU, the TB, or the PUSCH is performed or determined based on at least one of PDCP, Radio Link Control (RLC), MAC, or Physical Layer (PHY).

Optionally, processing or a processing rule of the packet, the PDCP SDU, the SDU, the PDU, the TB, or the PUSCH is determined based on the arrival order and/or the number of packets, PDCP SDUs, SDUs, PDUs, TBs, or PUSCHs.

Optionally, the arrival order of the packet, the PDCP SDU, the SDU, the PDU, the TB, or the PUSCH is represented by a Sequence (SN) number, and the SN number includes at least one of a PDCP SN number or a RLC SN number.

Optionally, a relationship between the first rule and the second rule includes at least one of:

the first rule being to select a first RLC entity or a first logical channel, and the second rule being to select a second RLC entity;

the first rule being to select a normal transmission or a relax transmission, and the second rule being to select the highly reliable transmission; or the first rule being to select a first parameter, and the second rule being to select a second parameter.

Optionally, the specific transmission rule is further configured to perform specific processing in a case of configuring or indicating the first information, and/or perform processing on an object corresponding to the first information.

FIG. 4 is a schematic block diagram of a terminal device 400 according to an embodiment of the present disclosure. The terminal device 400 may include:

a processing unit 410, configured to perform a relevant operation of the survival time according to first information, where the first information includes relevant information of the survival time.

Optionally, the relevant information of the survival time includes at least one of: the survival time, a Data Radio Bearer (DRB) identity, a Quality of Service (QoS) flow identity, a Packet Data Unit (PDU) session identity, a service arrival time, a service pattern, a service period, a related timer configuration, indication information for using the relevant information of the survival time, or indication information for performing the relevant operation of the survival time.

Optionally, the first information is predefined, or indicated by an access network or a core network.

Optionally, as shown in FIG. 5, the terminal device further includes: a receiving unit 420, configured to receive an indication signaling from a network device, where the indication signaling is configured to indicate whether to perform the relevant operation of the survival time, and/or, which operation of the survival time is to be performed.

Optionally, the indication signaling includes at least one of Radio Resource Control (RRC), Media Access Control (MAC), or Downlink Control Information (DCI).

Optionally, the performing the relevant operation of the survival time includes at least one of:

determining whether to enter or start the survival time;

determining whether to exit or end the survival time;

determining a survival time status; or determining an action of a timer related to the survival time.

Optionally, the determining whether to enter or start the survival time includes at least one of:

determining to enter or start the survival time in a case that a packet or a Packet Data Convergence Protocol (PDCP) Service Data Unit (SDU) is considered to be at least one of lost, unsuccessfully received, or transmitted in error;

determining to enter or start the survival time in a case that the packet or the PDCP SDU arrives at a PDCP layer of a sender;

determining to enter or start the survival time in a case that the packet or the PDCP SDU leaves the PDCP layer of the sender;

sending the packet or the PDCP SDU, and determining to enter or start the survival time;

sending a SDU, a PDU, a TB, or a PUSCH, and determining to enter or start the survival time;

determining to enter or start the survival time in a case that the PDCP SDU is considered to be at least one of lost, unsuccessfully received, or transmitted in error; or determining to enter or start the survival time in a case that the SDU, the PDU, the TB, or the PUSCH is considered to be at least one of lost, unsuccessfully received, or transmitted in error.

Optionally, entering or starting the survival time indicates entering or starting the survival time status.

Optionally, the determining the action of the timer related to the survival time includes:

determining whether to enter or start the survival time by using a first timer.

Optionally, a condition for starting the first timer includes at least one of:

the packet or the PDCP SDU arriving at the PDCP layer of the sender;

the packet, the PDCP SDU, or the PDCP PDU leaving the PDCP layer of the sender;

sending the packet or the PDCP SDU; or sending the SDU, the PDU, the TB, or the PUSCH.

For example, the packet or the PDCP SDU corresponds to a first timer. For another example, the SDU, the PDU, the TB, or the PUSCH corresponds to a first timer.

For yet another example, all packets or all PDCP SDUs correspond to a first timer. For yet another example, all SDUs, all PDUs, all TBs, or all PUSCHs correspond to a first timer.

For still another example, all packets of the same object correspond to a first timer. Alternatively, each packet of the same object corresponds to a first timer.

Optionally, a duration of the first timer is related to a Packet Delay Budget (PDB).

Optionally, the determining whether to enter or start the survival time by using the first timer includes:

entering or starting the survival time, if a Non-Acknowl-edgment (NACK) feedback is received before expiration of the first timer, or, if no Acknowledgment (ACK) feedback is received before the expiration of the first timer, or, if no feedback is received before the expiration of the first timer, or, after the expiration of the first timer.

Optionally, the determining whether to exit or end the survival time includes at least one of:

in a case of having entered or started the survival time or maintaining the survival time status, determining to exit or end the survival time if the packet or the PDCP SDU is successfully transmitted;

in a case of having entered or started the survival time or maintaining the survival time status, determining to exit or end the survival time if the SDU, the PDU, the TB, or the PUSCH is successfully transmitted;

in a case of having entered or started the survival time or maintaining the survival time status, determining to exit or end the survival time if an ACK feedback for at least one packet or at least one PDCP SDU is received; or in a case of having entered or started the survival time or maintaining the survival time status, determining to exit or end the survival time if an ACK feedback for at least one SDU, at least one PDU, at least one TB, or at least one PUSCH is received.

Optionally, exiting or ending the survival time indicates exiting or ending the survival time status.

Optionally, the determining the action of the timer related to the survival time further includes at least one of:

in a case of entering or starting the survival time, or in a case of entering or starting the survival time status, starting a second timer; or in a case of exiting or ending the survival time, or in a case of exiting or ending the survival time status, stopping the second timer.

Optionally, the processing unit is further configured to perform at least one of:

reporting to a higher layer a problem or triggering a link transmission failure reporting or initiating a RRC connection reestablishment, after expiration of the second timer or if no reporting or specific transmission is performed before the expiration of the second timer;

exiting or ending the survival time after the expiration of the second timer;

exiting or ending the survival time if the packet or the PDCP SDU is successfully transmitted before the expiration of the second timer;

exiting or ending the survival time if the SDU, the PDU, the TB, or the PUSCH is successfully transmitted before the expiration of the second timer;

exiting or ending the survival time if an ACK feedback for at least one packet or at least one PDCP SDU is received before the expiration of the second timer; or exiting or ending the survival time if an ACK feedback for at least one SDU, at least one PDU, at least one TB, or at least one PUSCH is received before the expiration of the second timer.

Optionally, the performing the relevant operation of the survival time further includes at least one of:

starting the first timer in a case of receiving the ACK feedback;

restarting the first timer in a case that the ACK feedback is received before the expiration of the first timer;

stopping the first timer, entering or starting the survival time, and/or starting the second timer, in a case that the ACK feedback is not received or a NACK feedback is received or no feedback is received before the expiration of the first timer;

entering or starting the survival time, and/or, starting the second timer, after the expiration of the first timer;

stopping the second timer, and/or, starting the first timer, upon entering or starting the survival time, maintaining the survival time status, or during operation of the second timer; or starting the first timer or triggering the link transmission failure reporting or initiating the RRC connection reestablishment or triggering problem reporting, in a case that the NACK feedback is always received or the ACK feedback is never received or feedback is never received in the survival time or the survival time status, or during the operation of the second timer, or the survival time status is exited or ended, or the second timer expires.

Optionally, the performing the relevant operation of the survival time further includes at least one of:

determining whether to receive or process a corresponding Downlink Feedback Indication (DFI);

determining whether to perform the reporting; or determining whether to perform the specific transmission.

Optionally, the performing, by the processing unit, the relevant operation of the survival time according to the first information includes:

performing, by the terminal device, at least one of the following operations according to the first information in a case that a first condition is met:

determining whether to perform the reporting; or determining whether to perform the specific transmission.

Optionally, the first condition includes at least one of: the survival time being a specific value, the survival time being less than a Round-Trip Time (RTT), the survival time being less than Y times the RTT, the PDB being less than the RTT, the PDB being less than a service period or a resource period, the PDB being less than X times the RTT, not a specific subcarrier spacing, a Time Division Duplex (TDD) operation mode or configuration, indicating or configuring a jitter, or a specific jitter value.

Optionally, the performing the specific transmission includes:

performing different transmissions for an initial transmission and a retransmission of the packet, the PDCP SDU, or the MAC PDU; or performing different transmissions for an initial transmission and a retransmission of the SDU, the PDU, the TB, or the PUSCH.

Optionally, the performing the different transmissions for the initial transmissions and the retransmissions includes at least one of:

performing a highly reliable transmission for at least one of the initial transmission and the retransmission;

performing a highly reliable transmission for at least one retransmission; or performing a highly reliable transmission for the initial transmission.

Optionally, the performing the specific transmission further includes:

performing the same transmission for an initial transmission and a retransmission of the packet, the PDCP SDU, or the MAC PDU; or performing the same transmission for an initial transmission and a retransmission of the SDU, the PDU, the TB, or the PUSCH.

Optionally, the performing the same transmission for the initial transmission and the retransmission includes:

performing a highly reliable transmission for the initial transmission and the retransmission.

Optionally, the performing, by the processing unit, the relevant operation of the survival time according to the first information includes:

performing, by the terminal device, at least one of the following operations according to the first information in a case that a second condition is met:

determining whether to receive or process a corresponding DFI;

determining whether to perform the reporting; or determining whether to perform the specific transmission.

Optionally, the first information further includes at least one of:

a correspondence between the survival time and a Logical Channel (LCH);

a correspondence between the survival time and a Hybrid Automatic Repeat reQuest (HARQ); or a correspondence between the survival time and a Configured Grant (CG).

Optionally, the second condition includes at least one of:

the survival time being bonded to the LCH;

the survival time being bonded to a HARQ process; or the survival time being bonded to the CG.

Optionally, the performing the reporting or the performing the specific transmission includes:

performing a DFI feedback, and/or, performing the reporting or performing the specific transmission, on a HARQ process corresponding to the survival time.

Optionally, the performing the reporting or the performing the specific transmission further includes at least one of:

performing the reporting or performing the specific transmission, on a HARQ process or a corresponding LCH or CG whose DFI is NACK, in a case of receiving the DFI; or performing the reporting or performing the specific transmission, on a DFI feedback for a HARQ process corresponding to the survival time or a DFI feedback for a LCH or a CG corresponding to the survival time.

Optionally, the performing the specific transmission includes:

performing the specific transmission by using a subsequent CG resource.

Optionally, the performing the specific transmission includes:

performing a highly reliable transmission.

Optionally, the performing the highly reliable transmission includes at least one of: performing a duplicate transmission, performing a repetition transmission, using another set of duplicate transmission times, using another set of repetition transmission times, using a second set of Modulation and Coding Scheme (MCS), using another resource configuration, using another set of resource configuration parameters, using another set of LCH mapping restrictions, cancelling a LCH mapping restriction, using a first set of LCH configuration parameters, using a second set of physical layer transmission parameters, or using a second prioritization processing method.

Optionally, the determining whether to perform the reporting or the determining whether to perform the specific transmission includes at least one of:

performing the reporting or performing the specific transmission in a case of having entered or started the survival time;

performing the reporting or performing the specific transmission before the expiration of the second timer;

performing the reporting or performing the specific transmission upon entering or starting the survival time;

performing the reporting or performing the specific transmission while maintaining the survival time status; or performing the reporting or performing the specific transmission during the operation of the second timer.

Optionally, the performing the specific transmission further includes:

performing the transmission according to a specific rule.

Optionally, the performing the transmission according to the specific rule includes at least one of:

for an object, performing the transmission according to a first rule every X packets or PDCP SDUs, and performing the transmission according to a second rule every Y packets or PDCP SDUs; or for the object, performing the transmission according to the first rule every X SDUs or PDUs or TBs or PUSCHs, and performing the transmission according to the second rule every Y packets or SDUs or PDUs or TBs or PUSCHs.

Optionally, the first rule and the second rule are processed interactively.

Optionally, the processing unit further includes:

determining an interaction mode between the first rule and the second rule, and/or determining whether to use the first rule or the second rule, according to a duration, an order, or an indication.

Optionally, processing or a processing rule of the packet, the PDCP SDU, the SDU, the PDU, the TB, or the PUSCH is performed or determined based on at least one of the PDCP, Radio Link Control (RLC), the MAC, or a Physical Layer (PHY).

Optionally, processing or a processing rule of the packet, the PDCP SDU, the SDU, the PDU, the TB, or the PUSCH is determined based on the arrival order and/or the number of packets, PDCP SDUs, SDUs, PDUs, TBs, or PUSCHs.

Optionally, the arrival order of the packet, the PDCP SDU, the SDU, the PDU, the TB, or the PUSCH is represented by a Sequence (SN) number, and the SN number includes at least one of a PDCP SN number or a RLC SN number.

Optionally, a relationship between the first rule and the second rule includes at least one of:

the first rule being to select a first RLC entity or a first logical channel, and the second rule being to select a second RLC entity;

the first rule being to select a normal transmission or a relax transmission, and the second rule being to select the highly reliable transmission; or the first rule being to select a first parameter, and the second rule being to select a second parameter.

Optionally, the specific transmission rule is further configured to perform processing in a case of configuring or indicating the first information, and/or perform processing on an object corresponding to the first information.

The terminal device 400 in embodiments of the present disclosure can implement the corresponding functions of the terminal device in the foregoing method embodiments. For the processes, functions, implementations, and beneficial effects corresponding to each module (sub-module, unit, or component, etc.) in the terminal device 400, reference may be made to the corresponding descriptions in the foregoing method embodiments, which will not be repeated herein. It should be noted that the functions described for the various modules (sub-modules, units, or components, etc.) in the terminal device 400 in embodiments of the present disclosure may be realized by different modules (sub-modules, units, or components, etc.), or can also be realized by the same module (sub-module, unit, or component, etc.).

FIG. 6 is a schematic structural diagram of a communication device 600 according to an embodiment of the present disclosure. The communication device 600 includes a processor 610. The processor 610 may call a computer program from a memory and run the computer program, to cause the communication device 600 to implement the method in embodiments of the present disclosure.

Optionally, the communication device 600 may further include a memory 620. The processor 610 may call the computer program from the memory 620 and run the computer program, to cause the communication device 600 to implement the method in embodiments of the present disclosure.

The memory 620 may be a separate component independent of the processor 610, or may be integrated into the processor 610.

Optionally, the communication device 600 may further include a transceiver 630. The processor 610 may control the transceiver 630 to communicate with another device. Specifically, the transceiver 630 may transmit information or data to another device, or receive information or data transmitted by another device.

The transceiver 630 may include a transmitter and a receiver. The transceiver 630 may further include an antenna. There may be one or more antennas.

Optionally, the communication device 600 may be the network device in embodiments of the present disclosure, and the communication device 600 may implement respective procedures performed by the network device in various methods according to embodiments of the present disclosure. For brevity, details are not described herein again.

Optionally, the communication device 600 may be the terminal device in embodiments of the present disclosure, and the communication device 600 may implement respective procedures performed by the terminal device in various methods according to embodiments of the present disclosure. For brevity, details are not described herein again.

Figure 7:
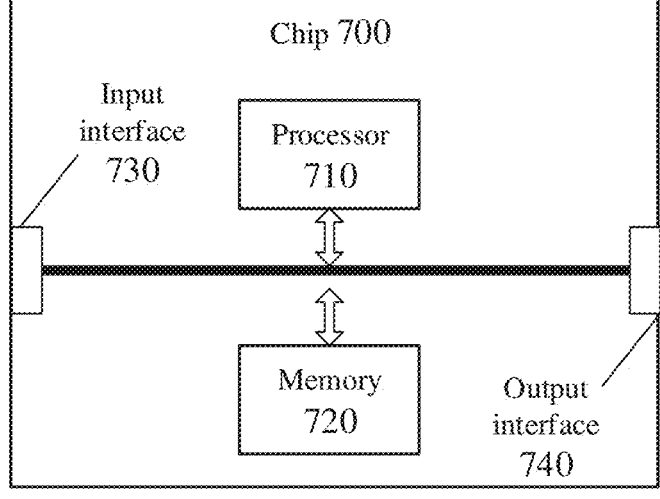
FIG. 7 is a schematic block diagram of a chip according to an embodiment of the present disclosure.

FIG. 7 is a schematic structural diagram of a chip 700 according to an embodiment of the present disclosure. The chip 700 includes a processor 710 which can call and run a computer program from a memory to implement the method according to embodiments of the present disclosure.

Optionally, the chip 700 may further include a memory 720. The processor 710 can call and run the computer program from the memory 720 to implement the method performed by the terminal device or the network device in embodiments of the present disclosure.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, to acquire information or data transmitted by other devices or chips.

Optionally, the chip 700 may further include an output interface 740. The processor 710 may control the output interface 740 to communicate with other devices or chips, and specifically, to output information or data to other devices or chips.

Optionally, the chip may be applied to the network device in embodiments of the present disclosure, and the chip may implement respective procedures performed by the network device in various methods according to embodiments of the present disclosure. For brevity, details are not described herein again.

Optionally, the chip may be applied to the terminal device in embodiments of the present disclosure, and the chip may implement respective procedures performed by the terminal device in various methods according to embodiments of the present disclosure. For brevity, details are not described herein again.

Chips applied to the terminal device and the network device may be the same chip or different chips It should be understood that the chip mentioned in embodiments of the present disclosure may also called a system-level chip, a system chip, a chip system, a system-on-chip, or the like.

The mentioned processor may be a universal processor, a Digital Signal Processor (DSP), a Field Programmable Gate Array (FPGA), an Application Specific Integrated Circuit (ASIC), or other programmable logical device, a transistor logical device, a discrete hardware component, or the like. The above-mentioned universal processor may be a microprocessor, or may also be any conventional processor, and the like.

The above-mentioned memory may be a volatile memory or a nonvolatile memory, or may include both volatile and nonvolatile memories. The nonvolatile memory may be a Read-Only memory (ROM), a Programmable ROM (PROM), an Erasable PROM (EPROM), an Electrically EPROM (EEPROM), or a flash memory. The volatile memory may be a Random Access Memory (RAM).

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), among others. That is to say, the memory in embodiments of the present disclosure is intended to include but is not limited to those and any other suitable types of memories.

Figure 8:
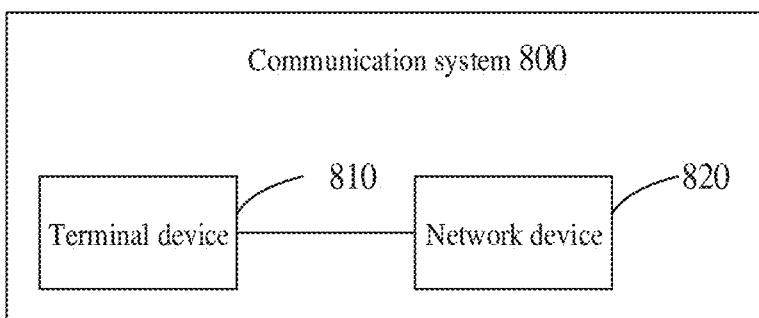
FIG. 8 is a schematic block diagram of a communication system according to an embodiment of the present disclosure.

FIG. 8 is a schematic block diagram of a communication system 800 according to an embodiment of the present disclosure. The communication system 800 includes a terminal device 810 and a network device 820.

The terminal device 810 is configured to perform a relevant operation of the survival time according to first information, where the first information includes relevant information of the survival time.

Optionally, the network device 820 may send the first information to the terminal device.

The terminal device 810 may be configured to implement respective functions performed by the terminal device in the above methods, and the network device 820 may be configured to implement respective functions performed by the network device in the above methods. For brevity, details are not described herein again.

In the above embodiments, implementations may be accomplished in whole or in part by software, hardware, firmware, or any combination thereof. When implemented using software, the implementation may be in whole or in part in the form of a computer program product. The computer program product includes one or more computer instructions. Loading and executing the computer program instructions on a computer produces, in whole or in part, a process or function as described in accordance with embodiments of the present disclosure. The computer may be a general-purpose computer, a specialized computer, a computer network, or other programmable device. The computer instructions may be stored in a computer-readable storage medium or transmitted from one computer-readable storage medium to another computer-readable storage medium. For example, the computer instructions may be transmitted from one website site, computer, server, or data center to another via wired (e.g., coaxial cable, optical fiber, Digital Subscriber Line (DSL)) or wireless (e.g., infrared, wireless, microwave, etc.) means. The computer-readable storage medium may be any available medium that a computer can access, or a data storage device such as a server, data center, etc. that contains one or more available medium integrated. The available medium may be magnetic medium, (e.g., floppy disk, hard disk, magnetic tape), optical medium (e.g., DVD), or semiconductor medium (e.g., solid status disk (SSD)), etc.

It should be understood that, in various embodiments of the present disclosure, the size of the sequence numbers of the above-mentioned processes does not mean the order of execution, and the execution order of each process should be determined by its function and the internal logic, and should not constitute any limitation on the implementation process of embodiments of the present disclosure.

It may be clearly understood by a person skilled in the art that, for the purpose of convenient and brief description, with respect to the detailed working process of the system, device, and unit, reference may be made to a corresponding process in the foregoing method embodiments, details of which are not described herein again.

Those described above are merely specific embodiments of the present disclosure, and the protection scope of the present disclosure is not limited thereto. Any change or substitution that is readily conceived of by a person skilled in the art within the technical scope disclosed in the present disclosure shall fall within the protection scope of the present disclosure. Therefore, the protection scope of the present disclosure shall be defined by the appended claims.

What is claimed is:

1. A processing method for a survival time, comprising:
    receiving, by a terminal device, an indication signaling from a network device, wherein the indication signaling is configured to indicate whether to perform a relevant operation of the survival time; and
    performing, by the terminal device, the relevant operation of the survival time according to first information and the indication signaling, wherein the first information is indicated by an access network and comprises relevant information of the survival time,
    wherein the relevant information of the survival time comprises a Data Radio Bearer (DRB) identity;
    wherein the performing, by the terminal device, the relevant operation of the survival time according to the first information and the indication signaling comprises:
    performing, by the terminal device, the following operation according to the first information and the indication signaling in a case that a first condition is met:
        determining to perform a specific transmission;
    wherein the performing the specific transmission comprises: performing a highly reliable transmission; and
    wherein the performing the highly reliable transmission comprises: performing a duplicate transmission,
    wherein the performing the relevant operation of the survival time comprises at least one of:
    determining whether to enter or start the survival time;
    determining whether to exit or end the survival time;
    determining a survival time status; or
    determining an action of a timer related to the survival time.

2. The processing method according to claim 1, wherein the relevant information of the survival time further comprises at least one of:
    the survival time, a Quality of Service (QoS) flow identity, a Packet Data Unit (PDU) session identity, a service arrival time, a service pattern, a service period, a related timer configuration, indication information for using the relevant information of the survival time, or indication information for performing the relevant operation of the survival time.

3. The processing method according to claim 1, wherein the indication signaling comprises at least one of:
    Radio Resource Control (RRC), Media Access Control (MAC), or Downlink Control Information (DCI).

4. The processing method according to claim 1, wherein the determining whether to enter or start the survival time comprises at least one of:
    determining to enter or start the survival time in a case that a packet or a Packet Data Convergence Protocol (PDCP) Service Data Unit (SDU) is considered to be at least one of lost, unsuccessfully received, or transmitted in error;
    determining to enter or start the survival time in a case that the packet or the PDCP SDU arrives at a PDCP layer of a sender;
    determining to enter or start the survival time in a case that the packet or the PDCP SDU leaves the PDCP layer of the sender;
    sending the packet or the PDCP SDU, and determining to enter or start the survival time;
    sending a SDU, a PDU, a Transport Block (TB), or a Physical Uplink Shared Channel (PUSCH), and determining to enter or start the survival time;
    determining to enter or start the survival time in a case that the PDCP SDU is considered to be at least one of lost, unsuccessfully received, or transmitted in error; or
    determining to enter or start the survival time in a case that the SDU, the PDU, the TB, or the PUSCH is considered to be at least one of lost, unsuccessfully received, or transmitted in error.

5. The processing method according to claim 4, wherein entering or starting the survival time indicates entering or starting the survival time status.

6. The processing method according to claim 1, wherein the performing, by the terminal device, the relevant operation of the survival time according to the first information further comprises:
    performing, by the terminal device, at least one of the following operations according to the first information in a case that the first condition is met:
    determining whether to receive or process a corresponding Downlink Feedback Indication (DFI); or
    determining whether to perform reporting.

7. The processing method according to claim 6, wherein the first information further comprises at least one of:
    a correspondence between the survival time and a Logical Channel (LCH);
    a correspondence between the survival time and a Hybrid Automatic Repeat reQuest (HARQ); or
    a correspondence between the survival time and a Configured Grant (CG).

8. The processing method according to claim 6, wherein the first condition comprises at least one of:
    the survival time being bonded to the LCH;
    the survival time being bonded to a HARQ process; or
    the survival time being bonded to the CG.

9. The processing method according to claim 1, wherein the performing the highly reliable transmission further comprises at least one of:

performing a repetition transmission, using another set of duplicate transmission times, using another set of repetition transmission times, using a second set of Modulation and Coding Scheme (MCS), using another resource configuration, using another set of resource configuration parameters, using another set of LCH mapping restrictions, cancelling a LCH mapping restriction, using a first set of LCH configuration parameters, using a second set of physical layer transmission parameters, or using a second prioritization processing method.

10. The processing method according to claim 1, wherein the determining to perform the specific transmission comprises at least one of:

performing the specific transmission in a case of having entered or started the survival time;

performing the specific transmission before the expiration of the second timer;

performing the specific transmission upon entering or starting the survival time;

performing the specific transmission while maintaining the survival time status; or performing the specific transmission during the operation of the second timer.

11. A terminal device, comprising: a processor and a memory, wherein the memory is configured to store a computer program, and the processor is configured to call and run the computer program stored in the memory, to cause the terminal device to perform a processing method for a survival time, comprising:

receiving an indication signaling from a network device, wherein the indication signaling is configured to indicate whether to perform a relevant operation of the survival time; and performing the relevant operation of the survival time according to first information and the indication signaling, wherein the first information is indicated by an access network and comprises relevant information of the survival time, wherein the relevant information of the survival time comprises a Data Radio Bearer (DRB) identity;

wherein the performing the relevant operation of the survival time according to the first information and the indication signaling comprises:

performing the following operation according to the first information and the indication signaling in a case that a first condition is met:

determining to perform a specific transmission, wherein the performing the specific transmission comprises: performing a highly reliable transmission; and wherein the performing the highly reliable transmission comprises: performing a duplicate transmission, wherein the performing the relevant operation of the survival time comprises at least one of:

determining whether to enter or start the survival time;

determining whether to exit or end the survival time;

determining a survival time status; or determining an action of a timer related to the survival time.

12. The terminal device according to claim 11, wherein the relevant information of the survival time further comprises at least one of:

the survival time, a Quality of Service (QoS) flow identity, a Packet Data Unit (PDU) session identity, a service arrival time, a service pattern, a service period, a related timer configuration, indication information for using the relevant information of the survival time, or indication information for performing the relevant operation of the survival time.

13. The terminal device according to claim 11, wherein the indication signaling comprises at least one of:

Radio Resource Control (RRC), Media Access Control (MAC), or Downlink Control Information (DCI).

14. The terminal device according to claim 11, wherein the determining whether to enter or start the survival time comprises at least one of:

determining to enter or start the survival time in a case that a packet or a Packet Data Convergence Protocol (PDCP) Service Data Unit (SDU) is considered to be at least one of lost, unsuccessfully received, or transmitted in error;

determining to enter or start the survival time in a case that the packet or the PDCP SDU arrives at a PDCP layer of a sender;

determining to enter or start the survival time in a case that the packet or the PDCP SDU leaves the PDCP layer of the sender;

sending the packet or the PDCP SDU, and determining to enter or start the survival time;

sending a SDU, a PDU, a Transport Block (TB), or a Physical Uplink Shared Channel (PUSCH), and determining to enter or start the survival time;

determining to enter or start the survival time in a case that the PDCP SDU is considered to be at least one of lost, unsuccessfully received, or transmitted in error; or determining to enter or start the survival time in a case that the SDU, the PDU, the TB, or the PUSCH is considered to be at least one of lost, unsuccessfully received, or transmitted in error.

15. The terminal device according to claim 14, wherein entering or starting the survival time indicates entering or starting the survival time status.

16. The terminal device according to claim 11, wherein the performing the relevant operation of the survival time according to the first information further comprises:

performing at least one of the following operations according to the first information in a case that the first condition is met:

determining whether to receive or process a corresponding Downlink Feedback Indication (DFI); or determining whether to perform reporting.

17. The terminal device according to claim 16, wherein the first information further comprises at least one of:

a correspondence between the survival time and a Logical Channel (LCH);

a correspondence between the survival time and a Hybrid Automatic Repeat reQuest (HARQ); or a correspondence between the survival time and a Configured Grant (CG).

18. The terminal device according to claim 16, wherein the first condition comprises at least one of:

the survival time being bonded to the LCH;

the survival time being bonded to a HARQ process; or the survival time being bonded to the CG.

* * * * *